H. N. WHITTELSEY.
VEHICLE.
APPLICATION FILED MAY 28, 1912.
1,126,326.
Patented Jan. 26, 1915.
6 SHEETS—SHEET 2.
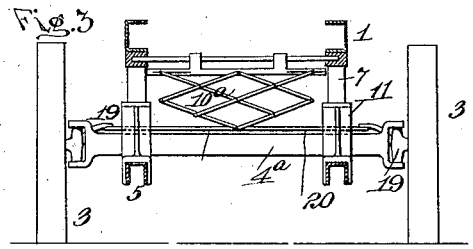
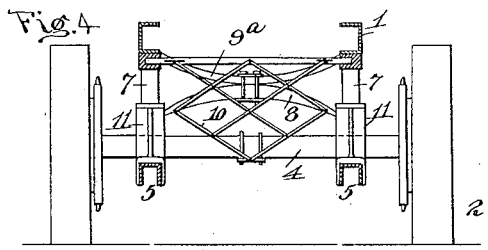
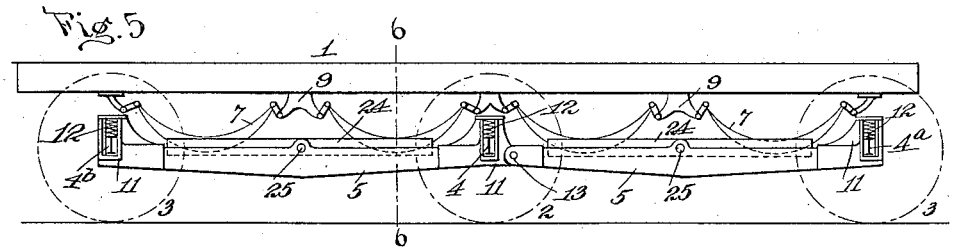
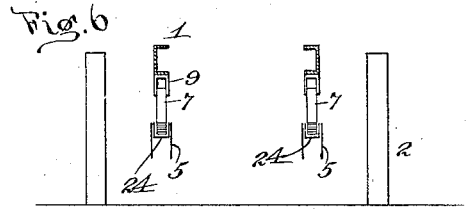
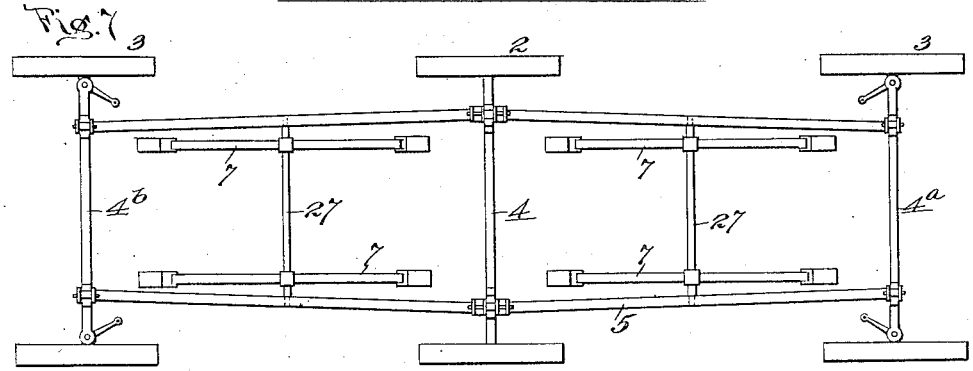
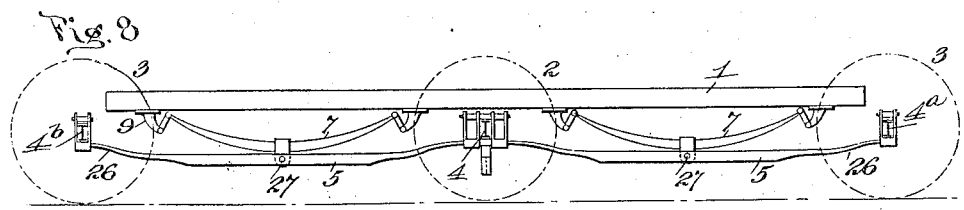
Witnesses:
John L. Lotsch
Gustav A. Schellack
Inventor
Henry Newton Whittelsey
By Dyer, Dyer & Taylor
Attorneys.

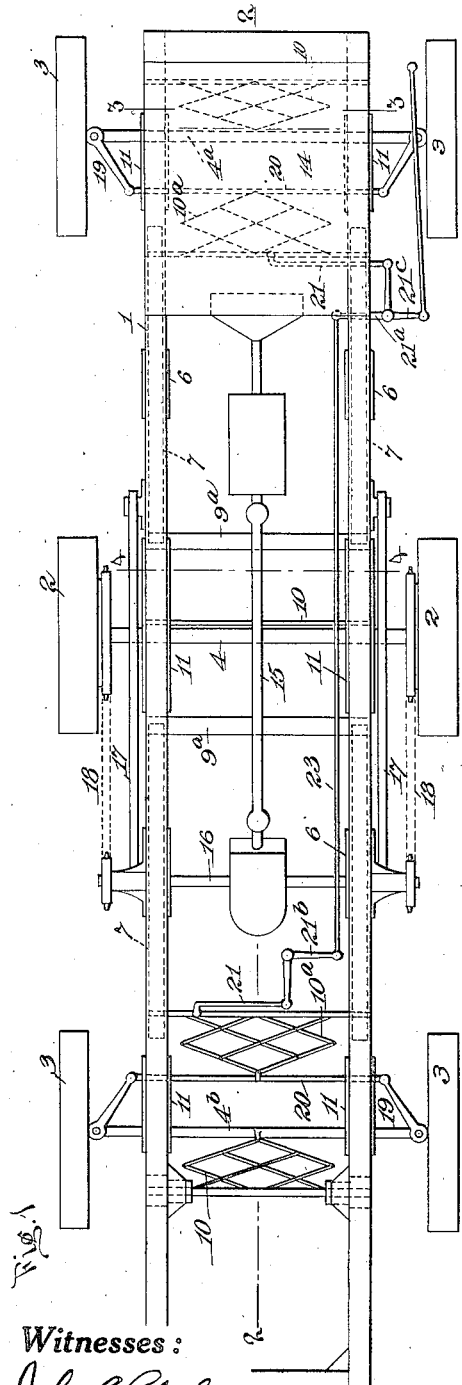

H. N. WHITTELSEY.
VEHICLE.
APPLICATION FILED MAY 28, 1912.
1,126,326.
Patented Jan. 26, 1915.
6 SHEETS—SHEET 3.
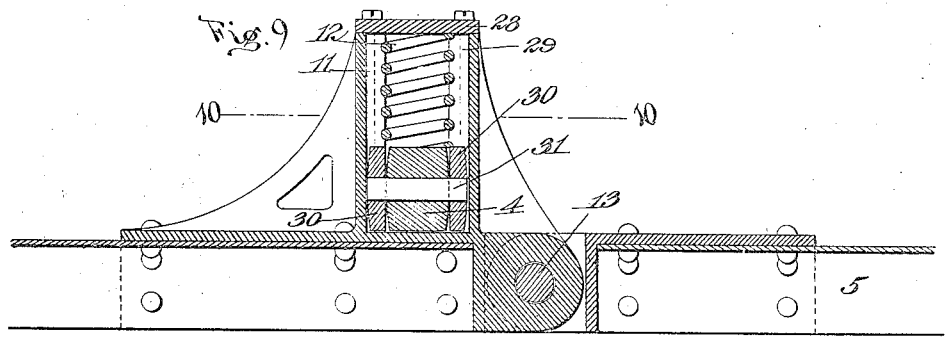
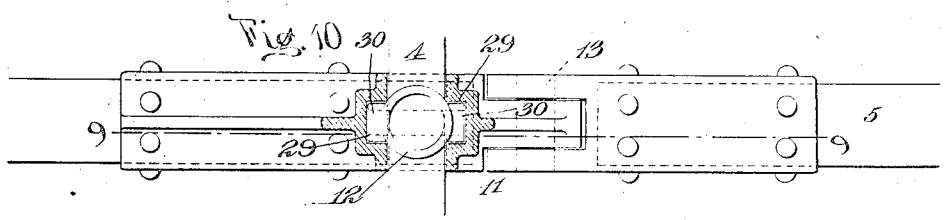
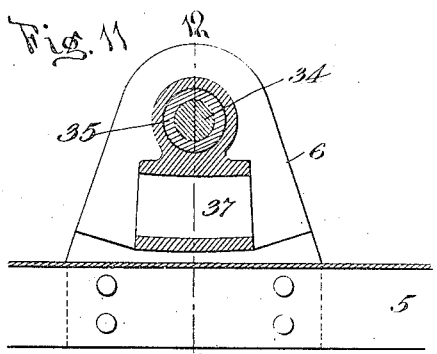
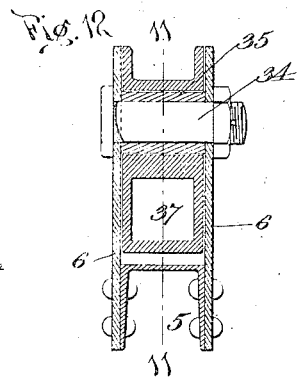
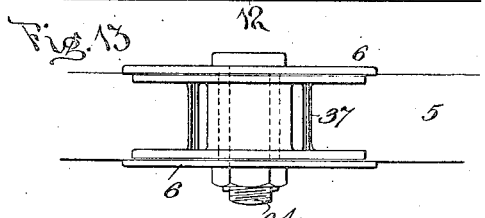
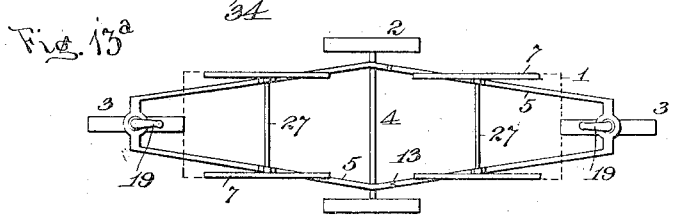
Witnesses:
John L. Lotsch
Gustav A. Schellack
Inventor
Henry Newton Whittelsey
By Dyer Dyer & Taylor
Attorneys.

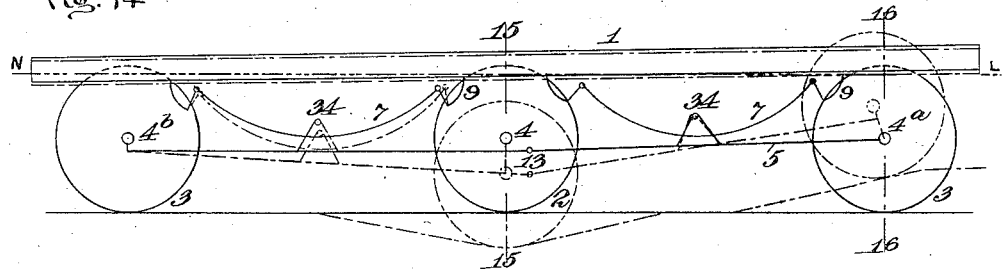
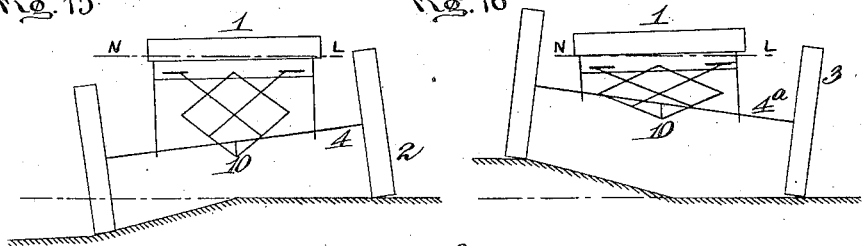
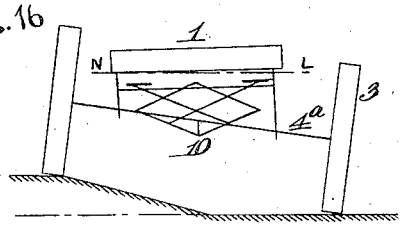
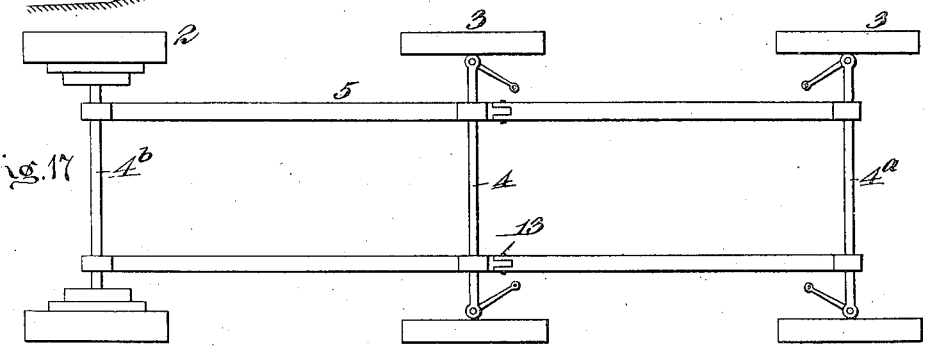
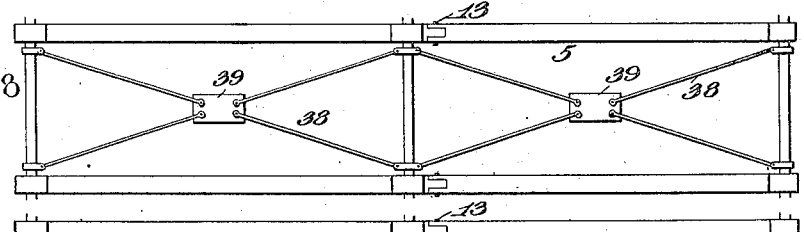
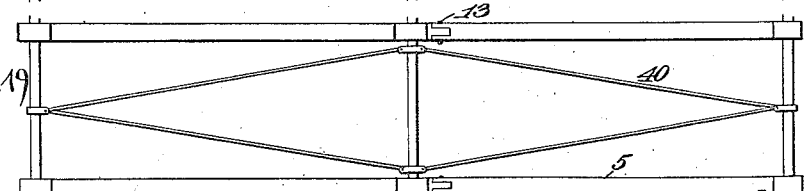

H. N. WHITTELSEY.
VEHICLE.
APPLICATION FILED MAY 28, 1912.
1,126,326.
Patented Jan. 26, 1915.
6 SHEETS—SHEET 5.
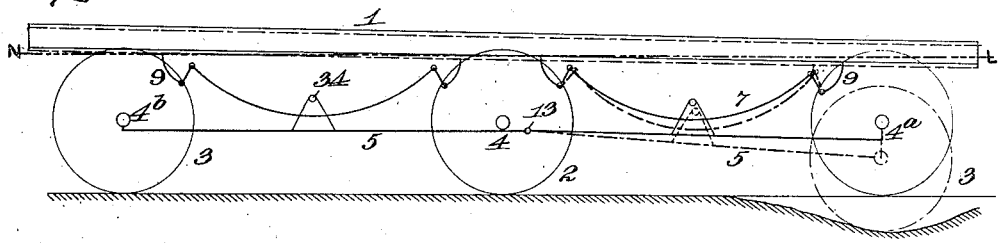
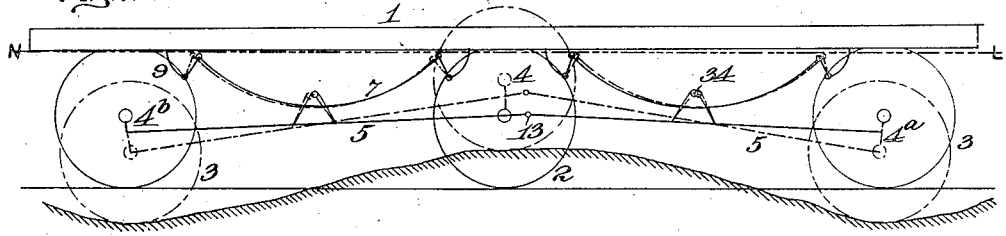
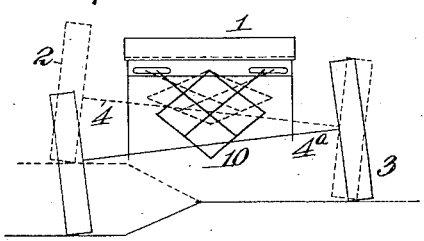
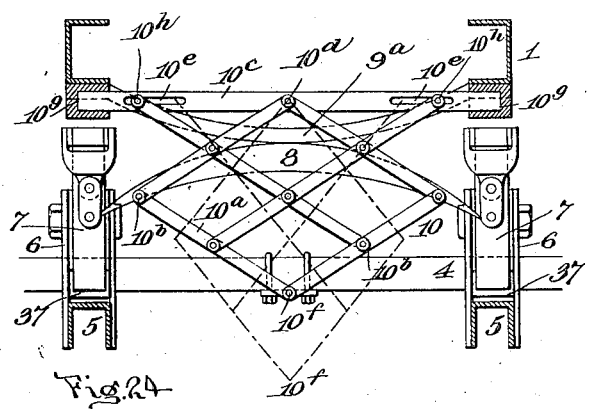
Witnesses:
John L. Lotsch
Gustav A. Schellack
Inventor
Henry Newton Whittelsey
By Dyer Dyer & Taylor
Attorneys.

H. N. WHITTELSEY.
VEHICLE.
APPLICATION FILED MAY 28, 1912.
1,126,326.
Patented Jan. 26, 1915.
6 SHEETS—SHEET 6.
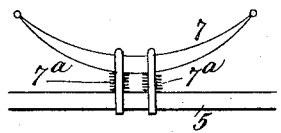
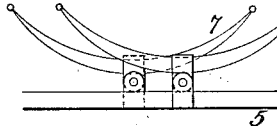
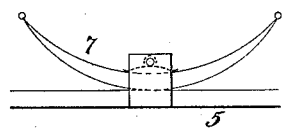
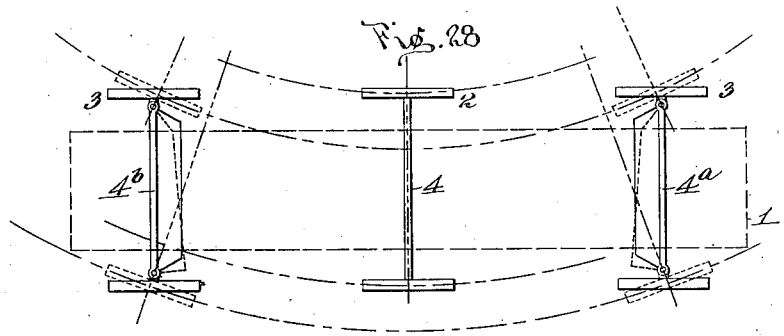
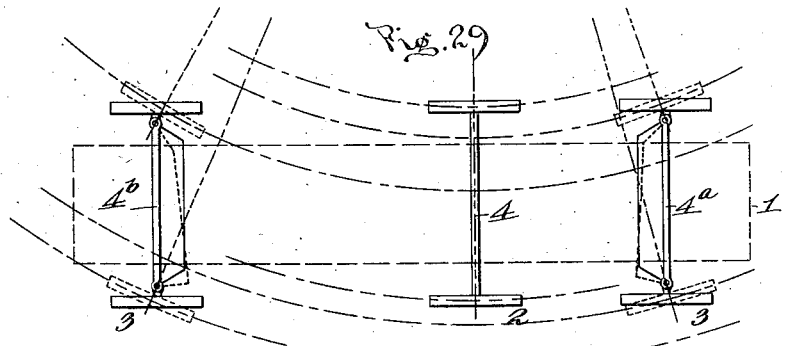
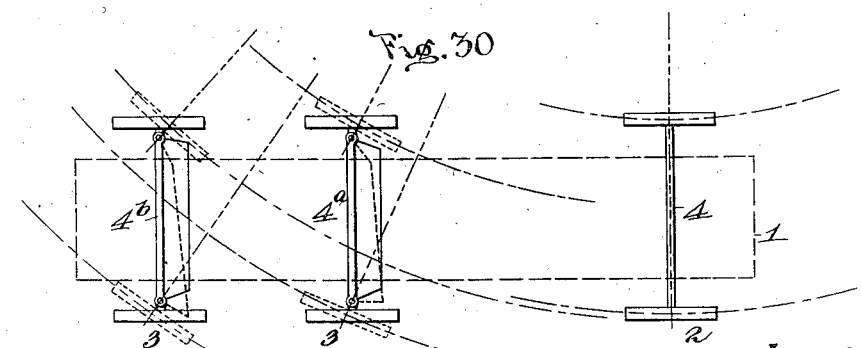
Witnesses:
John L. Rotch
Gustav A. Schellack
Inventor
Henry Newton Whittelsey
By Dyer Dyer & Taylor
Attorneys.

UNITED STATES PATENT OFFICE.

HENRY NEWTON WHITTELSEY, OF GREENWICH, CONNECTICUT.

VEHICLE.

1,126,326.   Specification of Letters Patent.   Patented Jan. 26, 1915.

Application filed May 28, 1912. Serial No. 700,186.

*To all whom it may concern:*

Be it known that I, HENRY NEWTON WHITTELSEY, a citizen of the United States, residing in the town of Greenwich, county of Fairfield, and State of Connecticut, have invented a certain new and useful Vehicle, of which the following is a specification.

This invention relates to vehicles primarily intended to be used for traveling upon roads. It has particular reference to self-propelled vehicles. Certain features of the invention about to be described, however, may be applied to vehicles of different kinds.

The objects I have in view are: First: to avoid the necessity of elastic tires, or spring wheels, which cause expense, weight, and resistance to traction. Second: to improve the riding qualities of the vehicle, by reducing and eliminating jolts and vibrations. This makes the vehicle capable of profitable use upon roads of great roughness and inequalities. Third: to increase the durability of the vehicle. Fourth: to produce a device which will utilize more delicate and elastic springs than have heretofore been capable of being employed. Fifth: to increase the length and carrying capacity of the vehicle, without decreasing the manoeuvering abilities of the same. Sixth: to decrease skidding on turns, and side sliding on slippery roads of high camber. Seventh: to produce a device in which the proportion of load on the drive wheels is the same at all times. Eighth: to more equally distribute the vehicle load, and thus reduce wear on the roads.

Further objects are to produce a device which will possess the preceding advantages, which will not be unduly complicated or expensive, and which will have a pleasing and attractive appearance.

These and further objects will more fully appear from the following specification and accompanying drawings, considered together or separately.

In the drawings, Figure 1 is a plan view of a chassis of a motor vehicle, having six wheels and embodying my invention. Fig. 2 is a longitudinal section on the line 2—2 of Fig. 1, certain parts not being in section. Fig. 3 is a transverse section on the line 3—3 of Fig. 1, looking to the left. Fig. 4 is a similar section on the line 4—4 of Fig. 1, also looking to the left. Fig. 5 is a diagrammatic, side elevation of a chassis, showing a modification of the invention. Fig. 6 is a transverse section of the structure shown in Fig. 5, taken on the line 6—6 of that figure. Fig. 7 is a diagrammatic plan view of a portion of a chassis, embodying another modification of the invention. Fig. 8 is a side view of the same, but showing the main frame of the chassis in place. Fig. 9 is a detail section, on the line 9—9 of Fig. 10, of one form of axle box, and hinged joint between the longitudinal members of the structures illustrated in Figs. 1 and 2. Fig. 10 is a section on the line 10—10 of Fig. 9. Fig. 11 is a sectional view on the line 11—11 of Fig. 12, of one form of spring support similar to that shown in the embodiment of the invention illustrated in Figs. 1 and 2. Fig. 12 is a section on the line 12—12 of Fig. 11. Fig. 13 is a plan view of the structures illustrated on Figs. 11 and 12. Fig. 13ᵃ is a diagrammatic plan view of a portion of a chassis, embodying another modification of the invention. Fig. 14 is a diagrammatic view of the preferred embodiment of the invention illustrated in Figs. 1 and 2, showing the position of the wheels and axles, with one of the center wheels depressed and one of the end wheels on the same side elevated. Fig. 15 is a similar view, showing a cross-section, the section being taken on the line 15—15 of Fig. 14. Fig. 16 is a view similar to that of Fig. 15, taken on the line 16—16 of Fig. 14. Fig. 17 is a diagrammatic plan view of a portion of the chassis, showing a modification of the invention in which the driving wheels are located at one end of the frame. Fig. 18 is a diagrammatic view of a portion of the chassis, showing a device for holding the running gear without reliance on the vehicle frame. Fig. 19 is another diagrammatic view of a portion of the chassis, showing still another device for holding the running gear true. Fig. 20 is a view similar to Fig. 14, showing the same structure but illustrating the position of the wheels with one of the end wheels in a depression in the road bed, the other wheels being on the normal horizontal plane. Fig. 21 is a similar view, showing a distortion of the road bed, in which one of the center wheels is elevated and the end wheels on the same side are depressed. Fig. 22 is an end view of the same, showing the position of the axles and wheels when the parts are in the position shown in Fig. 21. Fig. 23 is a detail sectional view of the frame and longitudinal members, showing one form of a compensating strut. Figs. 24, 25, 26 and 27 are detail views showing modified forms of spring support, and Figs. 28, 29 and 30 are diagrammatic views illustrating the turning operations of various forms of chassis.

In all of the views, like parts are designated by the same reference characters.

Attention is called first to Figs. 1, 2, 3 and 4. These figures illustrate a motor vehicle chassis made according to the preferred embodiment of my invention. The frame 1, is shown as of rectangular shape in order to accommodate a suitable load-carrying floor or body. The character of load-carrying floor or body depends upon the nature of the vehicle. The invention may be used in connection with vehicles for carrying passengers. It may then have the ordinary automobile body. It may be used as a truck, for carrying loads. In that case, any form of body may be employed, as desired. The frame is shown as formed of channel irons. This form of frame is shown solely for purposes of illustration.

In the embodiment chosen for illustration, there are six wheels. In order to attain all of the objects of my invention, it is necessary that there be more than two axles longitudinally disposed. This may be attained with six wheels, or less than six wheels, on the axles. Fig. 13$^a$ shows three axles longitudinally disposed, with four wheels. Certain advantages of the invention may be attained with more than three axles. The description of the present invention, however, is restricted to a vehicle having four or six wheels. It is to be understood, however, that the number of wheels and number of axles are immaterial, provided there are more than two axles longitudinally disposed.

Referring more particularly to Figs. 1 and 2, the drive wheels are indicated by the characters 2, 2. They are located, in the embodiment chosen for illustration, at about the middle of the chassis, intermediate the ends thereof. The steering wheels 3, 3, are located two in front of and two behind the drive wheels. They are preferably, though not necessarily, equally spaced in relation to the driving wheels. The axles 4, 4$^a$, 4$^b$, connect the wheels in the usual manner. The axle for the driving wheels is shown as located halfway between the front and rear axles. This position is chosen solely for illustration. The driving axle may be located in any other position, nearer one axle or the other, without departing from the invention.

The axles 4 and 4$^a$ are connected together by longitudinal frames 5. The axles 4$^a$ and 4$^b$, are also connected together by longitudinal frames 5. These I term longitudinal load-carrying frames, as they preferably carry the entire weight of the vehicle frame and frame load. In the embodiment chosen for illustration, there are two load-carrying frames on the right side, and two load-carrying frames on the left side of the vehicle. All longitudinal load-carrying frames are connected to the axles, intermediate the ends of the latter. Referring to Fig. 2, the longitudinal load-carrying frames are shown made up of the channel bars, and the axle boxes 11, together with their parts. The forward longitudinal load-carrying frames are shown hinged on the pivots 13 to the rear longitudinal load-carrying frames. This allows the front and rear load-carrying frames to act vertically, independent of each other. The pivots 13 may be located directly below the center of the middle axle. For structural simplicity, the pivot is preferably placed just forward of the middle axle. This location permits the forward longitudinal load-carrying frames to act substantially the same as if the pivots were directly below the center of the middle axle. The boxes 11, and the axles have means to hold the boxes in a longitudinal fixed position on the axles which are connected thereto. At the same time, these means will permit the axles considerable cant, that is,— allow one end of any axle to rise or fall considerably more than the other end of the same axle. Therefore, all axles and the ends thereof are free to rise and fall through the means provided by the action of the pivot connections of the longitudinal load-carrying frames and the connections of the boxes to the axles. The functions of these longitudinal load frames are preferably to carry the entire load of the vehicle frame and to transmit the frame load to the axles. A further function is to maintain the longitudinal position of the axles. This is done by having the load-carrying frames possess proper longitudinal stiffness. A still further function is to permit the axles free vertical and limited oscillatory movement independent of each other. The members of the longitudinal load-carrying frames shown in the preferred embodiment are so designed as to perform the above specified functions.

The longitudinal load-carrying frames may be composed of any other suitable members,—either rigid or elastic,—that will allow them to perform the same functions, without departing from the invention, such as a long leaf spring, or a bar with leaf spring ends, as will be described herein, and indicated in Fig. 8. These longitudinal load-carrying frames may be connected to the axles independent of each other, provided the connections are made in a manner to permit them to perform their proper functions. Other forms of longitudinal load-carrying frames are illustrated in this application for patent, and will hereinafter be described.

I will now refer to the connections between the longitudinal load-carrying frames and the vehicle frame 1. In these connections are introduced particular means which perform very important functions necessary to fully attain all the objects of my invention. These means permit the ends of the longitudinal load-carrying frames to freely rise and fall in vertical longitudinal planes. They also permit this action of the frames independent of one another. These particular means I term axial members. It follows that through this action of the axial members, the load-carrying frames are permitted to perform their functions. Thus the axles have free vertical movement. One end of any axle may rise or fall with reference to the other end, or to the end of any other axle. In the preferred embodiment of my invention, I have shown such axial members as consisting of the pivots 34. They are located intermediate the ends of the longitudinal load-carrying frames and intermediate the axles which are connected together by such frames.

The axial members may be located midway between the ends of the longitudinal load-carrying frames, or they may be located nearer one end of the longitudinal frames than the other. This longitudinal location depends upon the proportion of load of the vehicle it is desired to carry on the connected axles. It also affects the relative vertical movement of the axial members with reference to the vertical movement of the axles which are connected together. The axial members are preferably located, however, in the vertical plane, midway between the axles which are connected together, and it is so shown in the preferred embodiment of my invention. In the illustration of the preferred embodiment, I have shown the axial members as composed of the pivots 34. Any other suitable rigid or elastic member or members that will permit the axial members performing their functions may be employed, without departing from the invention. I show other forms of axial members, which would be suitable in my preferred embodiment, such as two pivots (Fig. 26), two helical stiff springs (Fig. 25), a small, full elliptic spring (Fig. 24), and in Fig. 27 I also show a main side spring of the vehicle bearing directly on the longitudinal load-carrying frame in a manner to permit the longitudinal load-carrying frames to perform their functions. In this case, this spring has the function of an axial member. Therefore, any members, irrespective of their nature, which encompass the functions of the axial members, are axial members in fact and may be used without departing from my invention. A fuller description of modified forms of axial members will be made later in this specification. The connection between the axial members and the load frames may be any suitable rigid or elastic means that permit the axial members to perform their functions. In the preferred embodiment of the invention, I show the axial members 34, connected to the longitudinal load frames by the plates 6, which connections are suitable for the purpose.

The axial members are connected to the frame 1, of the vehicle, in a suitable manner to permit these members to perform their functions. In the preferred embodiment chosen for illustration, I show suitable means for this connection, as follows:—The pivots 34 support the spring saddles 37 (see Fig. 12). The spring saddles support the side springs 7. The side springs are connected at one end to the links 35 and spring brackets 9. The spring brackets are connected to the frame 1. The other end of the side springs is connected by ordinary double links 36 to the cross springs 8. The cross springs support the spring bolster 9ª. The spring bolster is attached to the vehicle frame 1 (see Fig. 23).

The links 35 and 36 in the connecting members between the longitudinal load carrying frames and the vehicle frame 1 perform a very important function. They enable the vehicle frame 1 to have a free, floating longitudinal action above the wheels, axles and longitudinal load carrying frames, which action is controlled by the radius rods 17, and permit the free action of the longitudinal load carrying frames, axles and wheels, which is necessary to properly travel upon the uneven surface of the ordinary road. Referring particularly to the diagrammatic Figs. 14, 20 and 21, the wheels on one side of the vehicle in each of these figures are shown more or less displaced. Where the wheels are displaced, the longitudinal load carrying frames are shown out of their normal position. This change in position effects the members connecting the longitudinal load carrying frames to the links 35 and 36, and effects these links, as is shown in these diagrammatic figures. It is evident that without this longitudinal compensating movement obtained in the action of these links, that undue stresses would be put on the connection members between the longitudinal load carrying frames and the frame of the vehicle. This would result in either breaking some of these connecting members or preventing some of these longitudinal load carrying members from performing their full and proper functions. These links I term, therefore, "longitudinal compensating members," owing to their particular function. It is not necessary to employ links as longitudinal compensating members, for the reason that other means can be satisfactorily used which will encompass the same function. Such longitudinal compensating members can be introduced in any suitable place between the longitudinal load-carrying members and the frame of the vehicle and can be of various forms without departing from the invention.

The load-carrying frames may be connected to the vehicle frame through any elastic, rigid, or combined elastic and rigid members, without departing from my invention, provided such connections permit the load-carrying frames to perform their functions. In order to attain fully the objects of my invention, it is preferable to make all load-carrying members of the vehicle converge at the axial members. This will transfer the entire load through the axial members to the longitudinal load-carrying frames, and through the longitudinal load-carrying frames to the axles. This is so shown in the preferred embodiment of my invention. The axial members may be directly connected to the frame 1 of the vehicle, without departing from my invention. It would still be possible for the axial members and the longitudinal load frames to perform their functions, when so arranged provided longitudinal compensating members were included in the connection. In fact, a member may be both an axial member and a longitudinal compensating member at the same time, as depends upon its function. In Figs. 7 and 8, I show still another form of axial members and connections, a description of which will be made later in this specification.

From the foregoing description, it is apparent that the vehicle frame 1 and the members connecting it to the longitudinal compensating members, can be considered a complete structure which acts as a whole. This I term a "frame gear structure." Also, it is apparent that the axles 4, 4ª, 4ᵇ, and their wheels, taken with the connecting load-carrying frames and any members connecting them to the longitudinal compensating members, can be considered another complete structure. This I term a "running gear structure." The longitudinal compensating members may be fixed to either the "frame gear structure" or the "running gear structure", and become part of the structure to which they are fixed.

Referring to Figs. 1 and 2, illustrating the preferred embodiment of my invention, I show radius rods 17, attached at one end to the frame 1, and attached at the other end to the axial members, namely,—the pivots 34. In this embodiment of the invention, the axial members are rigidly connected by the brackets 6, to the longitudinal load-carrying frames. Therefore, as the axial members are in this case part of the "running gear structure", the connecting of the radius rods to the axial members are connections to the latter structure. In the preferred embodiment of the invention, the vertical plane of the axial members is the plane of least vertical movement with reference to the vertical movement of the axles which are connected together, and therefore, the point of connection of the radius rods to the running gear structure is that of least vertical movement.

It follows that under all conditions of road, the movement of the radius rods is small, and therefore, causes no material distortion of the "running gear structure." These radius rods may, however, be connected at one end to any suitable point in the "running gear structure" without departing from my invention. The radius rods may even be dispensed with and the running gear structure correctly held longitudinally with reference to the "frame gear structure" by fitting longitudinally the compensating struts illustrated in Fig. 23 and described later. This device, or any others that encompass the same functions, may be used without departing from my invention.

Referring to the illustration of the preferred embodiment of the invention, I show the running gear structure correctly held transversely with reference to the frame gear structure by the four points of connection of the side spring saddles 37 (see Fig. 12), and the two points of connection of the radius rods. This is sufficient for relatively low speeds. However, for relatively high speeds it is preferable to hold the center of length of all axles perpendicular to the vehicle frame at its longitudinal center line. Otherwise, severe stresses might be placed on the connections between the load-carrying frames and the axles, by some of the wheels being caught in a rut or car track. I, therefore, fit transversely compensating struts 10, shown in Figs. 1, 2 and 4, and also shown in more detail in Fig. 23. These compensating struts maintain at all times the center of length of the axles perpendicular to the vehicle frame at its longitudinal center line. These also permit the axles free, independent vertical movement, and transmit no material load from the frame to the axles. They have a further special function, in that they prevent the side swerving of the frame of the vehicle at relatively high speeds. In the embodiment illustrated, I prefer to use one of these compensating struts, fitted transversely, between each axle and the vehicle frame. More or less may be fitted. They may be connected between any suitable points of the frame gear structure to the running gear structure, without departing from the invention. A fuller description of these compensating struts will be made later in this specification, and are specially claimed in my co-pending application for patent, before identified.

The stresses that might be placed on the connections of the load-carrying frames may be prevented to a certain extent by the use of diagonal reaches in the running gear structure. These are shown in Figs. 18 and 19. Either arrangement will hold the center of length of the axles in line. These diagonal reaches will be more fully explained later in this specification. The running gear structure may be connected to the frame gear structure by any other suitable devices that encompass, in whole or in part, functions of the compensating struts 10. The running gear structure may be fitted with any other suitable members to encompass the same functions as the diagonal reaches shown in Figs. 18 and 19, without departing from the invention.

Referring to Figs. 14, 15, 16, 20, 21 and 22, the preferred embodiment of the invention is shown in these figures diagrammatically.

Referring particularly to Fig. 20, the front right wheel is shown in a hollow, one-quarter the diameter of the wheel. The running gear structure is shown acting as follows:—The front ends of the longitudinal load carrying frames drop with the axles. The point of attachment of the load-carrying frames in the embodiment illustrated, is about midway between the center of length of the axles and their ends. Therefore, the right point of attachment drops about three-quarters the drop of the right wheel, and the left point of attachment drops about one-quarter the drop of the right wheel. This is evident from Fig. 22, in which the front axle is indicated by a solid line. The right front longitudinal load frame, therefore, is dropped at its front end about three-quarters the drop of the front right wheel, and at its rear end is at its normal position. Therefore, the right front axial member is dropped about three-eighths the drop of the front right wheel, and, further, the left front axial member, by the same reasoning, is dropped about one-eighth the drop of the front right wheel, and the rear axial members are in their normal position. It follows that the frame gear structure must adjust itself to less than half the drop of the right front wheel. This is well within the easy working range of the side springs. They will carry the frame of the vehicle to the position shown, without undue jolt or jar.

In Fig. 14, the right forward wheel has raised one-quarter its diameter, and the middle right wheel has fallen the same distance from the level. The position of the rear axial members, both right and left, is the same as the front axial members illustrated in Fig. 20. The right front longitudinal load-carrying frame is raised about three-quarters of the raise of the right front wheel, at the forward end, and the rear end is dropped about three-quarters of the drop of the right middle wheel. Therefore, the vertical movements of the axles counteract each other in their effect upon the right front longitudinal load-carrying frame, and there is no material vertical action on the right front axial member. There is also no material vertical movement of the left front axial member. The frame gear structure is, therefore, only slightly affected by this large vertical movement of the right wheels, and as the vertical movement of the rear axial members is well within the easy working range of the side springs, no severe jolts or shocks will be transferred to the vehicle frame. Figs. 15 and 16 are cross-sections showing the front and middle of the vehicle in action and the very slight side pitch of the vehicle frames with reference to its normal plane is very apparent. The compensating struts are here shown in action, and the diagrams clearly show these struts performing their functions.

Referring to Fig. 21, the right front wheel is dropped, the right middle wheel is raised, and the right rear wheel is dropped. The vertical movement of each wheel is shown as about one-quarter of its diameter. The action of the rear longitudinal load-carrying frame is substantially the same as the action of the front frames in Fig. 14, and the action of the front longitudinal load-carrying frames is the same as the rear, but is reversed. Therefore, there is no material vertical effect on the front or rear axial members and the frame of the vehicle is substantially in the normal position. Fig. 22 shows a cross-section at the front axle, and shows the middle axle and its wheels dotted. The rear axle and wheels fall in the same line as the front axle. The rise and fall of the wheels in these diagrammatic figures is about the maximum that vehicle wheels can be expected to ride, in proportion to their diameter and the road conditions indicated are most severe. It is apparent, from the diagrammatic drawings, and this description of the vehicle action, that the wheels of the same axle may rise or fall with reference to each other, or rise or fall together, and the resulting vertical action on the frame gear structure can never be more than one-half the vertical movement of the wheels. The average roadway is a series of rounded humps and dished hollows of more or less severity. The spread of the wheel traction surfaces in a vehicle built according to the preferred embodiment of my invention prevents, in the majority of cases, any two wheels being affected by the same hump or hollow at the same time. Consequently, the various wheels will generally be moved up and down to varying degrees, and will largely counteract each other in their vertical effect on the frame gear structure. The action is substantially as shown for the right wheels of the vehicle in Figs. 14, 15, 16, 21 and 22. It is apparent, therefore, that the movement substantially averages the uneven condition of the road surface. I, therefore, attain the principal objects of my invention through the means of a running gear structure with more than two axles longitudinally disposed, preferably arranged as shown in my preferred embodiment, which structure is free to adjust itself to all conditions of the ordinary roads, and which substantially averages the uneven condition of the road surfaces in its effect on the frame gear structure.

I will now describe the other parts of the vehicle as covered in the illustration of my preferred embodiment, and later describe certain details and modifications more fully. Referring more particularly to Figs. 1 and 2, a motor hood 14, is shown, in which there is an ordinary internal combustion motor and clutch. The power is carried through the longitudinal shaft 15 to the change gear transmission box, and from there through the shaft 15 to the differential gear box. From this latter point it is carried in the jack shaft 16, to the jack shaft sprockets, and from there to the sprockets on the middle wheels. Any other form of motive power may be used in place of an internal combustion motor. The motive power may be located at any suitable place in the vehicle and connected to the driving wheels in any suitable manner, without departing from the invention. I show the jack shaft and differential gear box supported from the longitudinal load-carrying frames. This is an important feature where chain drive is to be used. The driving wheels rise and fall on the ordinary road materially with reference to the vehicle frame, and consequently, materially increase and decrease the distance from the vehicle frame to the drive wheels. This would prevent the satisfactory use of chain. The jack shaft, however, as I have shown same located in this embodiment, remains substantially the same distance from the drive wheels. Any other system of connecting the power to the drive wheels or to live driving axles, may be used without departing from this invention. Any other form of power may be used and be connected to the drive wheels in any suitable manner, without departing from my invention.

Any suitable form of brakes may be used, and the operating connections therefor made up in any suitable manner. Neither the brakes or connections are shown in the illustration, as they are of the usual and well-known type. The vehicle is steered through the means of the steering knuckles, and arms 19, permitting the turning of the steering wheels 3, 3. The arms are connected by the distance rods 20. These are connected to the parallel steering bars 21 by the compensating steering lazy tongs 10$^a$, which permit the free relative vertical movement of the distance rods 20 in relation to the vehicle frame 1, without changing the relative longitudinal position of the steering bars 21 and the distance rods 20. These compensating steering tongs are diagrammatically illustrated in Fig. 3, and comprise rods or bars and pivots. The particular device is not illustrated in further detail, as it forms the subject of another application for patent filed by me.

The steering bars 21 are connected through bell cranks 21$^a$ and 21$^b$, to the longitudinal rod 23, all of which are supported by the frame 1. Thus, the steering of all wheels is accomplished simultaneously through the longitudinal movement of the rod 23. By this means, the vehicle is turned without side sliding of any wheels, and may be turned in a true circle. The forward bell crank 21$^a$ is shown with an extra arm 21$^c$ in the embodiment illustrated, and is connected to the ordinary steering gear device (not shown) customarily used on motor vehicles. In the embodiment illustrated, the distance of the steering axles 4$^a$ and 4$^b$ are equi-distant from the driving axle 4. In order to properly accomplish the turning of a vehicle with more than two axles longitudinally disposed, the steering wheels must be actuated as follows:—The projected center line of all steering wheels, when turning, must substantially meet at a point, (see Figs. 28, 29 and 30) and if there are any non-steering wheels, the projected center lines of these must also substantially pass through the same point. Therefore, with the steering axles spaced equi-distant from the non-steering axles as shown in the preferred embodiment, the transverse travels of the forward and rear rods 20 is the same. However, when the axles are not so spaced, the turning angles of the wheels on the different steering axles must vary. This I direct and control by making the distance rods 20 move in proper relation to each other. This relative motion I direct by so proportioning the arms of the bell cranks 21$^a$ and 21$^b$ connecting the rods 21 to the rod 23, to cause the proper relative movement, and thus correctly actuate the distance rods 20. The angle of steering wheels on the same axle is controlled in the customary way, by the angularity of the steering arms to the vertical longitudinal plane of the respective steering wheels.

I will now refer to the illustration of the embodiment of my invention, and particularly to the compensating struts 10. These compensating struts are shown in more detail in Fig. 23, which shows the preferred form. The rods, or bars 10ª, are hinged or pivoted together by rivets or pins or bolts 10ᵇ. Six rods are illustrated. Three of these rods incline to the right; the other three incline to the left, and cross the former rods. Two of the rods are connected to a bar 10ᶜ by means of the pivot 10ᵈ. Two more of the rods are connected to the bar 10ᶜ by pivots 10ʰ. These pivots slide in the slots 10ᵉ. The remaining two rods are connected at the apex by the pivot 10ᶠ. The bar 10ᶜ is supported in brackets 10ᵍ. The bar is round where it enters the brackets, permitting rotation of the device about the center line of the brackets. The pivot 10ᶠ is located immediately below the pivot 10ᵈ, and always remains in such a position, irrespective of the varying distance which may separate the axle and frame 1. This peculiar characteristic of this device is illustrated by the broken line which indicates the form of the device when the pivot 10ᶠ is considerably dropped. It is also diagrammatically illustrated in Figs. 15, 16 and 22. This device affords the means for holding the center of length of the axles perpendicularly below the frame 1 at the longitudinal center line. It also affords means to hold any axle in its proper relative longitudinal position with reference to the vehicle frame 1, provided the device is located in a longitudinal plane.

Referring to Figs. 9 and 10,—these show one of the longitudinal load frame members, and the axle boxes as employed in the preferred embodiment of my invention. The axle boxes 11 are closed at the top by means of a removable plate 28. The boxes have vertical grooves 29. Wearing blocks 30, attached to the axle, play in these grooves. The bearing faces of the axles, and the faces of the blocks parallel to them, are curved slightly as shown in Fig. 9, preferably upon the arc of a circle. This permits a partial and limited rotary movement within the axle box, and prevents jamming of the axle within the box by a slight rotation of the axle, incident to use. The wearing blocks are attached to the axle by means which permit angular movement of the axle in relation to the box. The means chosen for illustration is in the form of a pin 31. This pin passes through the axle, and also through the blocks. By means of these pins, the axle may be raised up on one side more than the other without jamming the wearing blocks within the grooves. A spring 12 is interposed between the axle and plate 28.

By removing this plate, the spring may be removed and the axle lifted out. The particular function of this spring is to take up the minor vibrations of the road. These minor vibrations are caused by slight unevenness of the surface, and small obstructions. Figs. 9 and 10 show the pivot 13, which affords means for permitting the forward longitudinal load frame to act vertically, independent of the rear longitudinal load-carrying frame. This pivot and the parts it connects are only used in connection with the middle axle boxes. Fig. 2 shows this construction.

Figs. 11, 12 and 13 show the preferred axial member and connections. The axial member is the pivot 34, supported by the plates 6 which are attached to either side of the frame 5. The pivot 34 is fitted with a bushing 35, which, in turn, carries a side spring saddle 37. The side springs are held and supported by this spring saddle. Fig. 26 shows another form of axial member having two pivots which are connected to the longitudinal load-carrying frame through brackets. The pivots support the spring saddles 37, which, in turn, support the side springs 7. It is apparent that these axial members will permit the longitudinal load frames to perform their functions within the range of certain vertical movement of the ends. Fig. 25 shows another modification of axial members. In this case, the two stiff springs 7ª, 7ª, form the axial members. Fig. 24 shows a modification of the form shown in Fig. 25, in which an elliptic spring 7ᵇ is employed. These springs are suitably connected to the longitudinal load-carrying frames and are also connected to the side spring saddles, which, in turn, are connected to the side springs 7. It is apparent that the action of these stiff springs permits the longitudinal load frames to perform their functions through a certain range of vertical movement of their ends. It is apparent that one of the springs, or more than two of the springs, could be used for this purpose. Fig. 27 shows another modification of the axial member. In this case, the side spring bears directly on the longitudinal load frame, and permits the longitudinal load frame to roll on the lower surface of the the spring. The spring is held in place by suitable connections, and in this case the bearing part of the spring is considered the axial member.

Fig. 5 shows a modification of the invention in which four side springs are used on each side of the vehicle, instead of two as shown in the preferred embodiment. These side springs are supported by the spring beam 24, which is supported by an axial member 25, which, in turn, is supported by the longitudinal load-carrying frames. This modification of the springs and connections, or any other modification that will permit the running gear and the frame gear structures to perform their functions, may be used without departing from the invention.

Figs. 7 and 8 illustrate another modification of the running gear and frame gear structures of my invention. The longitudinal load-carrying members are shown connected to the three axles 4, 4ª and 4ᵇ. The connection of the longitudinal load-carrying members to the axles is by means of a hanger device which permits the free rising and falling of one end of any axle with reference to its other end. The ends of the load-carrying frames are shown in the form of a spring which is for the purpose of taking up the minor vibrations of the road. The entire load-carrying frame may be a spring, without departing from the invention. The axial members of this vehicle are the bars 27, which are secured to the longitudinal load-carrying frames. They may be rotated in the connections which support them on the longitudinal load frames. This is to enable the longitudinal load frames to act independently of each other. The axial members support the spring saddles, which, in turn, support the side spring 7, which, in turn, is connected by the ordinary links and brackets to the vehicle frame 1, the links forming the longitudinal compensating members. The axle 4 is bent down to clear the frame 1, when it is raised above its normal position. The axles 4ª and 4ᵇ are, in this vehicle, the steering axles, and the middle axle carries the driving wheels, which are non-steering. The steering of this vehicle is accomplished substantially the same as that shown in the preferred embodiment. The power to drive this vehicle may be any form of prime mover connected to the driving wheels in any suitable manner. This particular modification is especially adaptable to pleasure vehicles or automobiles. The particular arrangement of the running gear structure and frame gear structure enables the vehicle frame 1 to be placed relatively low, which is a desirable feature in pleasure vehicles.

Fig. 13ª illustrates a still further modification. Here, three axles are employed, but with one wheel at each end for steering, and two intermediate for driving. The steering wheels are mounted on forks, similar to a bicycle steering wheel. The vehicle frame 1 is supported by the longitudinal load-carrying frame 5, by means of the axial members 27, and side springs 7. The converging of the load frames toward the ends makes it desirable to attach the springs outside of the load frames.

Fig. 17 shows part of the running gear structure similar to the illustration of the preferred embodiment, but with the driving wheels fitted to the rear axle 4ᵇ, and the middle axle 4 used as a steering axle. The steering of this vehicle is accomplished as heretofore described, where the steering axles are unequally spaced in relation to the driving axle. The longitudinal load-carrying frames and frame gear structure are substantially as shown in Fig. 1. Any wheels on any axles may be used as driving wheels, without departing from the invention.

Figs. 18 and 19 show diagonal reaches, fitted in the running gear structure. The longitudinal load-carrying frames and axles are substantially the same as indicated in the preferred embodiment. In Fig. 18, the diagonal reaches 38 are connected to the axles at one end, and to plates 39 midway between the axles. This connection of the reaches to the plates permits the longitudinal load-carrying frames to have free, independent, vertical movement. It is apparent from this figure that these diagonal reaches will hold the running gear structure in correct longitudinal alinement.

Fig. 19 shows the diagonal reaches 40 as connecting the middle axle from just inside of the longitudinal load-carrying frame boxes, to the center of the end axles through a swivel bolt. It is apparent that this structure will hold the running gear structure in proper longitudinal alinement.

Either of these structures may be used without departing from the invention, as may other structures of a similar nature.

In accordance with the provisions of the patent statutes I have described the principle of my invention, together with the apparatus which I now consider to represent the best embodiment thereof; but I desire to have it understood that the apparatus shown is merely illustrative, and that the invention can be carried out in other ways.

Having now described my invention, what I claim as new and desire to secure by Letters Patent, is:—

1. A vehicle with more than two axles, longitudinally disposed, having a running gear structure, which comprises wheels; axles; and longitudinal load-carrying frames; a frame gear structure supported by the running gear structure, one of said structures including axial members, said axial members being carried by the load-carrying frames intermediate the ends thereof, and means within said running gear structure for maintaining constant the distance between adjacent axles.

2. A vehicle with more than two axles, longitudinally disposed, having a running gear structure, which comprises wheels; axles; and longitudinal load-carrying frames; a frame gear structure supported by the running gear structure, one of said structures including axial members, said axial members being carried by the load-carrying frames intermediate the ends thereof, means within said running gear structure for maintaining constant the distance between adjacent axles, and longitudinal compensating devices connecting the two structures.

3. A vehicle with more than two axles, longitudinally disposed, having a running gear structure, which comprises wheels; axles; and longitudinal load-carrying frames; pivots connecting certain of the load-carrying frames; a frame gear structure supported by the running gear structure, one of said structures including axial members, said axial members being carried by the load-carrying frames intermediate the ends thereof, and means within said running gear structure for maintaining constant the distance between adjacent axles.

4. A vehicle with more than two axles, longitudinally disposed, having a running gear structure, which comprises wheels; axles; and longitudinal load-carrying frames; pivots connecting certain of the road-carrying frames; a frame gear structure supported by the running gear structure, one of said structures including axial members, said axial members being carried by the load-carrying frames intermediate the ends thereof, means within said running gear structure for maintaining constant the distance between adjacent axles, and longitudinal compensating devices connecting the two structures.

5. A vehicle with more than two axles, longitudinally disposed; having a running gear structure, which comprises wheels, axles, and longitudinal load carrying frames connecting the axles; means within said running gear structure for maintaining constant the longitudinal distance between the axles; and a frame gear structure supported by the running gear; one of said structures including longitudinal compensating members.

6. A vehicle with more than two axles, longitudinally disposed: having a running gear structure, which comprises wheels, axles, and longitudinal load-carrying frames connecting the axles; means within said running gear structure for maintaining constant and longitudinal distance between the axles: and a frame gear structure supported by the running gear structure; longitudinal connections between the running gear structure, connected intermediate the axles, and the frame gear structure, for controlling the relative longitudinal position of one structure with reference to the other.

7. A vehicle with more than two axles, longitudinally disposed: having a running gear structure, which comprises wheels, axles, and longitudinal load carrying frames; means within said running gear structure for maintaining constant the longitudinal distance between the axles; a frame gear structure; compensating struts connecting the running gear and frame gear structures, said struts maintaining the relative positions of the points connected in the former structure with reference to the points connected in the latter structure, in the longitudinal directions of the struts, and not restricting the vertical movement of the axles.

8. A vehicle with more than two axles, longitudinally disposed: having a running gear structure, which comprises wheels, axles, and longitudinal load carrying frames connecting the axles; means within said running gear structure for maintaining constant the longitudinal distance between the axles; a frame gear structure; one of said structures including axial members; and one of said structures including longitudinal compensating members.

9. A vehicle with more than two axles, longitudinally disposed: having a running gear structure, which comprises wheels, axles, and longitudinal load carrying frames; means within said running gear structure for maintaining constant the longitudinal distance between the axles; a frame gear structure; one of said structures including axial members; one of said structures including longitudinal compensating members; longitudinal connections between the running gear structure, connected intermediate the axles, and frame gear structure, for controlling the relative longitudinal position of one structure with reference to the other.

10. A vehicle with more than two axles, longitudinally disposed: having a running gear structure, which comprises wheels, axles, and longitudinal load carrying frames; means within said running gear structure for maintaining constant the longitudinal distance between the axles: a frame gear structure; one of said structures including axial members; one of said structures including longitudinal compensating members; compensating struts connecting the running gear and frame gear structures; said struts maintaining the relative positions of the points connected in the former structure with reference to the points connected in the latter structure, in the longitudinal directions of the struts, and permitting free vertical movement of the axles.

11. A vehicle with more than two axles, longitudinally disposed: having a running gear structure, which comprises wheels, axles, and longitudinal load carrying frames; means within said running gear structure for maintaining constant the longitudinal distance between the axles; a frame gear structure; one of said structures including longitudinal compensating members; longitudinal connections between the running gear structure, connected intermediate the axles, and the frame gear structure, for controlling the relative longitudinal position of one structure with reference to the other.

12. A vehicle with more than two axles, longitudinally disposed: having a running gear structure, which comprises wheels, axles, and longitudinal load carrying frames; means within said running gear structure for maintaining constant the longitudinal distance between the axles; a frame gear structure; one of said structures including longitudinal compensating members; compensating struts connecting the running gear and frame gear structures; said struts maintaining the relative positions of the points connected in the former structure with reference to the points connected in the latter structure in the longitudinal directions of the struts, and permitting free vertical movement of the axles.

13. A vehicle with more than two axles, longitudinally disposed: having a running gear structure, which comprises wheels, axles, and longitudinal load carrying frames; means within said running gear structure for maintaining constant the longitudinal distance between the axles; a frame gear structure; one of said structures including axial members; one of said structures including longitudinal compensating members; longitudinal connections between the running gear structure, connected intermediate the axles, and the frame gear structure, for controlling the relative longitudinal position of one structure with reference to the other; motive power in the vehicle; the transmission of said motive power to the tractive surfaces of the driving wheels being from motive power members supported by the running gear structure intermediate the axles; compensating struts connecting the running gear and frame gear structures; said struts maintaining the relative positions of the points connected in the former structure with reference to the points connected in the latter structure in the longitudinal directions of the struts, and permitting free vertical movement of the axles.

14. A vehicle with more than two axles, longitudinally disposed: having a running gear structure, which comprises wheels, axles, and longitudinal load carrying frames; means within said running gear structure for maintaining constant the longitudinal distance between the axles; a frame gear structure; one of said structures including longitudinal compensating members; longitudinal connections between the running gear structure, connected intermediate the axles, and the frame gear structure for controlling the relative longitudinal position of one structure with reference to the other.

15. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame supported by the longitudinal load carrying members, and wheels fitted to the axles.

16. A vehicle with more than two axles longitudinally disposed: having in combination longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; an axial member in each system of connection between the vehicle frame and the longitudinal load carrying members; said axial members being independent of each other.

17. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; longitudinal compensating members in the connections between the longitudinal load carrying members and the vehicle frame, permitting longitudinal movement of the vehicle frame with reference to the longitudinal load carrying members.

18. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; radius rods longitudinally fixed at one end with reference to the vehicle frame, and longitudinally fixed at the other end with reference to longitudinal members connecting the axles, intermediate the axles.

19. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; motive power in the vehicle; the motor or the power connections from said motor being supported by members connecting the axles and intermediate the axles.

20. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; compensating struts connected between the vehicle frame and the axles, maintaining constant the position of the axles with reference to the vehicle frame in a vertical plane, and permitting free vertical action of the axles.

21. A vehicle with more than two axles longitudinally disposed: having in combination, longitudinal load carrying frames connecting all axles; the connections of the said longitudinal members to the axles embodying means to permit relative angular movement of the axles in vertical planes and restricting both lateral and longitudinal movement of the axles with reference to the said longitudinal members; a vehicle frame supported by the longitudinal load carrying members; axial members in the connections between the vehicle frame and the longitudinal load carrying members; and wheels fitted to the axles.

22. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; an axial member in each system of connection between the vehicle frame and the longitudinal load carrying members; longitudinal compensating members in the connections between the longitudinal load carrying members and the vehicle frame, permitting longitudinal movement of the vehicle frame with reference to the longitudinal load carrying members, and wheels fitted to the axles.

23. A vehicle with more than two axles, longitudinally disposed, having a vehicle frame; longitudinal load carrying frames connecting the axles; boxes on the ends of the load carrying frames; said boxes each having vertical guides; wearing blocks playing in the guides; and means connecting the axles with the blocks, to permit relative angular movement between each axle and block; and wheels fitted to the axles.

24. A vehicle with more than two axles, longitudinally disposed, having a vehicle frame; longitudinal load carrying frames connecting the axles; boxes on the end of the load-carrying frames; said boxes each having vertical guides; wearing blocks, playing in the guides, the outside faces of the blocks being curved, to permit partial relative rotary movement of the axles in the boxes; and means connecting the axles with the blocks, to permit relative angular movement between each axle and block; and wheels fitted to the axles.

25. A vehicle with more than two axles, longitudinally disposed, having a vehicle frame; longitudinal load carrying frames connecting the axles; boxes on the ends of the load carrying frames, said boxes each having vertical grooves; wearing blocks, playing in the grooves; and a pin connecting the axles with the blocks, to permit relative angular movement between each axle and block.

26. A vehicle with more than two axles, longitudinally disposed, having a vehicle frame; longitudinal load carrying frames connecting the axles; boxes on the ends of the load carrying frames, said boxes each having vertical grooves; wearing blocks, playing in the grooves, the outside faces of the blocks being curved to permit partial relative rotary movement of the axles in the boxes; and a pin connecting the axles with the blocks, to permit relative angular movement between each axle and block.

27. A vehicle with more than two axles longitudinally disposed: having in combination longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; an axial member in each system of connection between the vertical frame and the longitudinal load carrying member, said axial members being independent of each other; longitudinal compensating members in the connections between the longitudinal load carrying members and the vehicle frame, permitting longitudinal movement of the vehicle frame with reference to the longitudinal load carrying members.

28. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; an axial member in each system of connection between the vehicle frame and the longitudinal load carrying members, longitudinal compensating members in the connections between the longitudinal load carrying members and the vehicle frame, permitting longitudinal movement of the vehicle frame with reference to the longitudinal load carrying members; compensating struts connected between the vehicle frame and the axles, maintaining constant the position of the axles with reference to the vehicle frame in a vertical plane, and permitting free vertical action of the axles, and wheels fitted to the axles.

29. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; longitudinal compensating members in the connections between the longitudinal load carrying members and the vehicle frame, permitting longitudinal movement of the vehicle frame with reference to the longitudinal load carrying members; radius rods longitudinally fixed at one end with reference to the vehicle frame, and longitudinally fixed at the other end with reference to longitudinal members connecting the axles, intermediate the axles.

30. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; an axial member in each system of connection between the vehicle frame and the longitudinal load carrying members, longitudinal compensating members in the connections between the longitudinal load carrying members and the vehicle frame with reference to the longitudinal load carrying members; radius rods longitudinally fixed at one end with referenc to the vehicle frame, and longitudinally fixed at the other end with reference to longitudinal members connecting the axles, intermediate the axles; motive power in the vehicle; the motor or the power connections from said motor being supported by members connecting the axles and intermediate the axles; compensating struts connected between the vehicle frame and the axles, maintaining constant the position of the axles with reference to the vehicle frame in a vertical plane, and permitting free vertical action of the axles.

31. A vehicle with more than two axles longitudinally disposed: having in combination, longitudinal load carrying members connecting all axles; the connections of the said longitudinal members to the axles embodying means to permit relative angular movement of the axles in vertical planes and restricting both lateral and longitudinal movement of the axles with reference to the said longitudinal members; a vehicle frame; longitudinal compensating members in the connections between the longitudinal load carrying members and the vehicle frame, permitting longitudinal movement of the vehicle frame with reference to the longitudinal load carrying members; radius rods longitudinally fixed at one end with reference to the vehicle frame; and longitudinally fixed at the other end with reference to longitudinal members connecting the axles, intermediate the axles; motive power in the vehicle; the motor or the power connections from said motor being supported by members connecting the axles and intermediate the axles; compensating struts connected between the vehicle frame and the axles, maintaining constant the position of the axles with reference to the vehicle frame in a vertical plane, but not restricting the vertical action of the axles.

32. A vehicle with more than two axles longitudinally disposed: having in combination, longitudinal members supported by the axles, connecting the axles; a vehicle frame and springs, supporting the frame; motive power in the vehicle, the transmission of said motive power to the tractive surfaces of the driving wheels being from motive power transmission members supported by the longitudinal members intermediate the axles; and wheels fitted to the axles.

33. A vehicle with more than two axles longitudinally disposed: having in combination, longitudinal members supported by the axles, connecting the axles; a vehicle frame and springs, supporting the frame; compensating struts connecting the running gear and frame gear structures, said struts maintaining the relative positions of the points connected in the former structure with reference to the points connected in the latter structure in the longitudinal directions of the struts, and permitting free vertical movement of the axles.

34. A vehicle with more than two axles longitudinally disposed: having in combination, longitudinal members supported by the axles, connecting the axles; a vehicle frame and springs, supporting the frame;

longitudinal compensating members in the connections between the longitudinal load carrying members and the vehicle frame, permitting longitudinal movement of the vehicle frame with reference to the longitudinal load carrying members.

35. A vehicle with more than two axles longitudinally disposed: having in combination, longitudinal members supported by the axles, connecting the axles; a vehicle frame and springs, supporting the frame; radius rods longitudinally fixed at one end with reference to the vehicle frame, and longitudinally fixed at the other end with reference to longitudinal members connecting the axles, intermediate the axles.

36. A vehicle with more than two axles longitudinally disposed: having in combination, longitudinal members supported by the axles, connecting the axles; a vehicle frame and springs, supporting the frame; compensating struts connected between the vehicle frame and the axles, maintaining constant the position of the axles with reference to the vehicle frame in a vertical plane, and permitting free vertical action of the axles.

37. In a vehicle having more than two axles longitudinally disposed: comprising axles, springs, vehicle frame, and longitudinal load carrying members supported by the axles; said longitudinal load members connecting all the axles, the particular members making the axle connections being boxes having vertical guides; wearing blocks playing in the guides; pins connecting the axles with the blocks; and springs between the top of the boxes and the axles.

38. In a vehicle having more than two axles longitudinally disposed: comprising axles, springs, vehicle frame, and longitudinal load carrying members supported by the axles; axial members carried by the longitudinal load members intermediate their ends; said axial members being horizontal, laterally disposed pivots, there being a separate pivot carried by each longitudinal load member.

39. In a vehicle having more than two axles longitudinally disposed; comprising axles, springs, vehicle frame, and longitudinal load carrying members supported by the axles; radius rods controlling the relative longitudinal position of the vehicle frame with reference to certain of the longitudinal load carrying members, the connections to the latter being fixed longitudinally and carried intermediate the axles, and the connections to the former being fixed longitudinally.

40. In a vehicle having more than two axles longitudinally disposed; comprising wheels, axles, springs, vehicle frame, and longitudinal load carrying members supported by the axles; said longitudinal load member connections being boxes having vertical guides; wearing blocks playing in the guides; pins connecting the axles with the blocks; and springs between the top of the boxes and the axles; axial members carried by the longitudinal load members intermediate their ends; said axial members being horizontal, laterally disposed pivots, there being a separate pivot carried by each longitudinal load member.

41. In a vehicle having more than two axles longitudinally disposed; comprising wheels, axles, springs, vehicle frame, and longitudinal load carrying members supported by the axles; said longitudinal load members connecting all the axles, the particular members making the axle connections being boxes having vertical guides; wearing blocks playing in the guides; pins connecting the axles with the blocks; springs between the top of the boxes and the axles; axial members carried by the longitudinal load members intermediate their ends; said axial members being horizontal, laterally disposed pivots, there being a separate pivot carried by each longitudinal load member; and spring links attached to both ends of the springs permitting longitudinal movement of the springs with reference to the vehicle frame.

42. In a vehicle having more than two axles longitudinally disposed; comprising axles, springs, vehicle frame, and longitudinal load carrying members supported by the axles; axial members carried by the longitudinal load members intermediate their ends; said axial members being horizontal, laterally disposed pivots, there being a separate pivot carried by each longitudinal load member; radius rods controlling the relative longitudinal position of the vehicle frame with reference to certain of the longitudinal load carrying members, the connections to the latter being fixed longitudinally and carried intermediate the axles, and the connections to the former being fixed longitudinally.

43. In a vehicle having more than two axles longitudinally disposed; comprising axles, springs, vehicle frame, and longitudinal load carrying members supported by the axles; axial members carried by the longitudinal load members intermediate their ends; said axial members being horizontal, laterally disposed pivots, there being a separate pivot carried by each longitudinal load member; radius rods controlling the relative longitudinal position of the vehicle frame with reference to certain of the longitudinal load carrying members, the connections to the latter being fixed longitudinally and carried intermediate the axles, and the connections to the former being fixed longitudinally; a jack shaft supported by certain of the longitudinal load carrying members intermediate their ends.

44. In a vehicle having more than two axles longitudinally disposed; comprising axles, springs, vehicle frame, and longitudinal load carrying members supported by the axles; axial members carried by the longitudinal load members intermediate their ends; said axial members being horizontal, laterally disposed pivots, there being a separate pivot carried by each longitudinal load member; radius rods controlling the relative longitudinal position of the vehicle frame with reference to certain of the longitudinal load carrying members, the connections to the latter being fixed longitudinally and carried intermediate the axles, and the connections to the former being fixed longitudinally; a jack shaft supported by certain of the longitudinal load carrying members intermediate their ends; and compensating struts carried by the vehicle frame and connected to the axles maintaining the lateral position of the axles with reference to the vehicle frame, and carrying no material load of the vehicle frame.

45. In a vehicle having more than two axles longitudinally disposed; comprising axles, springs, vehicle frame, and longitudinal load carrying members supported by the axles; axial members carried by the longitudinal load members intermediate their ends, said axial members being horizontal, laterally disposed pivots, there being a separate pivot carried by each longitudinal load member; radius rods controlling the relative longitudinal position of the vehicle frame with reference to certain of the longitudinal load carrying members, the connections to the latter being fixed longitudinally and carried intermediate the axles, and the connections to the former being fixed longitudinally; a jack shaft supported by certain of the longitudinal load carrying members intermediate their ends; compensating struts carried by the vehicle frame and connected to the axles maintaining the lateral position of the axles with reference to the vehicle frame, and carrying no material load of the vehicle frame.

This specification signed and witnessed this 22nd day of May, 1912.

HENRY NEWTON WHITTELSEY.

Witnesses:
LEONARD H. DYER,
JOHN L. LOTSCH.